United States Patent
Chen et al.

(10) Patent No.: US 10,850,739 B2
(45) Date of Patent: Dec. 1, 2020

(54) AUTOMATIC LANE CHANGE WITH LANE-BIASED STRATEGY

(71) Applicant: SF Motors, Inc., Santa Clara, CA (US)

(72) Inventors: Jhenghao Chen, Santa Clara, CA (US); Chen Bao, Santa Clara, CA (US); Fan Wang, Santa Clara, CA (US); Yifan Tang, Santa Clara, CA (US)

(73) Assignee: SF Motors, Inc., Santa Clara, CA (US)

( * ) Notice: Subject to any disclaimer, the term of this patent is extended or adjusted under 35 U.S.C. 154(b) by 0 days.

(21) Appl. No.: 16/237,559

(22) Filed: Dec. 31, 2018

(65) Prior Publication Data

US 2020/0207353 A1 Jul. 2, 2020

(51) Int. Cl.
*B60W 30/18* (2012.01)
*G05D 1/00* (2006.01)
*G08G 1/16* (2006.01)

(52) U.S. Cl.
CPC ..... *B60W 30/18163* (2013.01); *G05D 1/0088* (2013.01); *G08G 1/167* (2013.01)

(58) Field of Classification Search
CPC ........... B60W 30/18163; G08G 1/167; G05D 1/0088
See application file for complete search history.

(56) References Cited

U.S. PATENT DOCUMENTS

| 2009/0162825 | A1* | 6/2009 | Sakai | B60W 30/095 434/322 |
| 2018/0293894 | A1* | 10/2018 | Zhang | G08G 1/167 |
| 2019/0061766 | A1* | 2/2019 | Nishiguchi | B60W 30/18163 |

OTHER PUBLICATIONS

Xing, Shiyu, and Mark Jakiela. "Lane Change Strategy for Autonomous Vehicle." (2018). (Year: 2018).*

* cited by examiner

*Primary Examiner* — Alan D Hutchinson
(74) *Attorney, Agent, or Firm* — Bachmann Law Group PC

(57) ABSTRACT

An autonomous vehicle automatically implements an intention aware lane change with a safety guaranteed lane biased strategy. To make a lane change, the autonomous vehicle first navigates within the current lane to near the edge of the current lane, to a position offset by a bias. By navigating to the edge of the lane, the autonomous vehicle provides a physical and virtual notification, in addition to a turn signal, that it is the intention of the vehicle to change into the lane adjacent to the edge of the lane in which the vehicle has navigated to. After performing a safety check and waiting for a minimum period of time during which vehicles in the adjacent lane can be assumed to have been warned or been put on notice of the lane change, the autonomous vehicle navigates into the adjacent lane.

17 Claims, 17 Drawing Sheets

AUTOMATIC LANE CHANGE WITH LANE-BIASED STRATEGY

BACKGROUND

Autonomous driving technology is growing rapidly with many features implemented in autonomous vehicles. Some car manufacturers have integrated lane change assist features into their production vehicles to help drivers avoid a collision with other vehicles coming at them from behind or with a vehicle driving in front of the user's vehicle.

SUMMARY

The present technology, roughly described, provides an autonomous vehicle that automatically implements an intention aware lane change with a safety guaranteed lane biased strategy. To make a lane change, the autonomous vehicle first navigates within the current lane to near the edge of the current lane, to a position offset by a bias. By navigating to the edge of the lane, the autonomous vehicle provides a physical and visual notification, in addition to a turn signal, that it is the intention to change into the lane adjacent to the edge of the lane in which the vehicle has navigated to. After performing a safety check and waiting for a minimum period of time during which vehicles in the adjacent lane can be assumed to have been warned or been put on notice of the lane change, the autonomous vehicle navigates into the adjacent lane.

By implementing the attention aware action of navigating from the center of a current lane to an edge for current lane offset by a bias, the autonomous vehicle may execute lane changes in dense traffic at a more successful rate and with higher safety than other systems. In dense traffic, when cars are close together and moving slowly, moving from the center of the lane to the edge of the lane will encourage drivers' vehicles in the adjacent lane to slow down or stop in order to create space for the autonomous vehicle to enter the adjacent lane. Because other vehicles are likely to slow down and make space for the autonomous vehicle, the lane change occurring in dense traffic situations will be more successful and safer than lane changes implemented by other systems.

In embodiments, a system for automatically navigating a vehicle between lanes using a bias offset is disclosed. The system includes a data processing system comprising one or more processors, memory, a planning module, and a control module. A planning module within the data processing system can generate a first reference line in a current lane from received sensor data, generate a biased reference line in the current lane with a bias offset from the received sensor data, and select a best trajectory from a plurality of trajectories from the first reference line to the biased reference line. A control module within the data processing system can also generate one or more commands to navigate the vehicle from the first reference line in the current lane to the biased reference line in current lane, and generate a second reference line for an adjacent lane from the received sensor data. The data processing system may further select a best trajectory from a plurality of trajectories from the biased reference line to the second reference line for the adjacent lane, and generate one or more commands to navigate from the biased reference line in the current lane to the second reference line in the adjacent lane.

In embodiments, a non-transitory computer readable storage medium includes a program, the program being executable by a processor to perform a method for automatically navigating a vehicle between lanes using a bias offset. The method can include generating a first reference line in a current lane from received sensor data, generating a biased reference line in the current lane with a bias offset from the received sensor data, and selecting a best trajectory from a plurality of trajectories from the first reference line to the biased reference line. The method can also include generating one or more commands to navigate the vehicle from the first reference line in the current lane to the biased reference line in current lane, and generating a second reference line for an adjacent lane from the received sensor data. The method can further include selecting a best trajectory from a plurality of trajectories from the biased reference line to the second reference line for the adjacent lane, and generating one or more commands to navigate from the biased reference line in the current lane to the second reference line in the adjacent lane.

In embodiments, a method is disclosed for automatically navigating a vehicle between lanes using a bias offset. The method includes generating, by a data processing system stored in memory and executed by one or more processors, a first reference line in a current lane from sensor data received from a perception component and generating, by the data processing system, a biased reference line in the current lane of the autonomous vehicle with a bias offset from the first reference line based on the received sensor data. The data processing system can select a best trajectory from a plurality of trajectories from the first reference line to the biased reference line, and then generate one or more commands to navigate the vehicle from the first reference line in the current lane to the biased reference line in current lane. The method may also include the data processing system generating a second reference line for an adjacent lane from the received sensor data, selecting a best trajectory from a plurality of trajectories from the biased reference line to the second reference line for the adjacent lane, and generating one or more commands to navigate from the biased reference line in the current lane to the second reference line in the adjacent lane.

DETAILED DESCRIPTION

Figure 1:
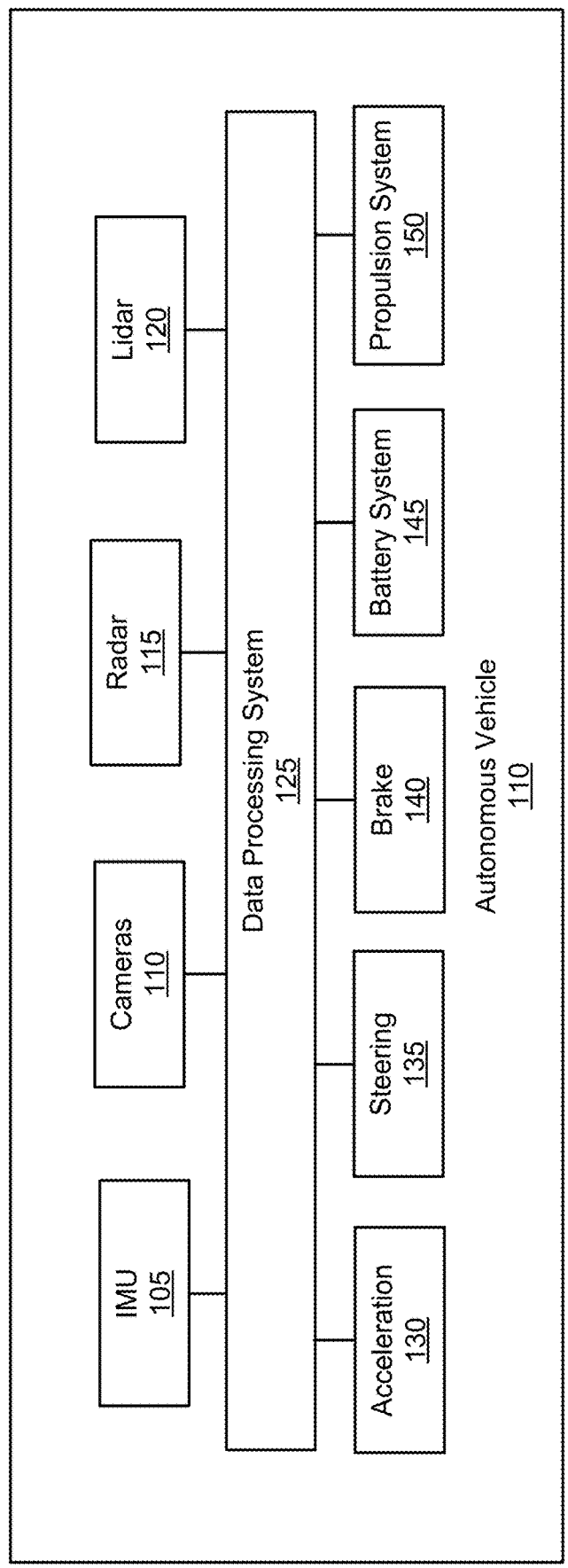
FIG. 1 is a block diagram of an autonomous vehicle.

The present technology, roughly described, provides an autonomous vehicle that automatically implements an intention aware lane change with a safety guaranteed lane biased strategy. To make a lane change, the autonomous vehicle first navigates within the current lane to near the edge of the current lane, to a position offset by a bias. By navigating to the edge of the lane, the autonomous vehicle provides a physical and virtual notification, in addition to a turn signal, of an intention to change into the lane adjacent to the edge of the lane in which the vehicle has navigated to. After performing a safety check and waiting for a minimum period of time during which vehicles in the adjacent lane can be assumed to have been warned or been put on notice of the lane change, the autonomous vehicle navigates into the adjacent lane.

By implementing the intention aware action of navigating from the center of a current lane to an edge for current lane offset by a bias, the autonomous vehicle may execute lane changes in dense traffic at a more successful rate and with higher safety than other systems. In dense traffic, when cars are close together and moving slowly, moving from the center of the lane to the edge of the lane will encourage drivers' vehicles in the adjacent lane to slow down or stop in order to create space for the autonomous vehicle to enter the adjacent lane. Because other vehicles are likely to slow down and make space for the autonomous vehicle, the lane change occurring in dense traffic situations will be more successful and safer than lane changes implemented by other systems.

The present technology performs lane changes in dense traffic situations that are not possible by other systems. Some car manufacturers have integrated lane change assist features into their production vehicles to help drivers avoid a collision with other vehicles coming at them from the behind or with a vehicle driving in front of the user's vehicle.

The current automatic lane change algorithm provides a smooth planning trajectory to steer a vehicle from one lane to an adjacent lane via an offset position from the edge of a current lane. By moving to the offset position before changing lanes, other vehicles are placed on notice of the intention of the autonomous vehicle to change lanes, and are therefore more likely to slow down or stop in order to let the autonomous vehicle enter the adjacent lane. Vehicles currently on the market take a long time to finish an automated lane change maneuver and cannot handle a safe lane change in heavy traffic situations. Rather, existing technology typically aborts the lane change function and requires the driver to take over to prevent a vehicle from missing a turn.

The technical problem addressed by the present technology involves safely and successfully navigating from a current lane to an adjacent lane in dense traffic situations. Typical automated lane change systems require a significant amount of empty space in the current lane and then adjacent lane before the lane change may be considered. In dense traffic situations, the required amount of empty space is simply not available. As a result, prior lane change systems are unable to make safe lane changes, or anything change at all, and a dense system. This issue in autonomous computer-controlled vehicles results in an inefficient navigation and, often times, a failure to navigate to a desired point.

The present technology provides a technical solution to the technical problem of safely and effectively implementing a lane change in dense traffic situations in which there is little or no pre-existing space between vehicles in an adjacent lane to which the autonomous vehicle intends to navigate. The solution is to implement a visual notification, in addition to a turn signal, by navigating an autonomous vehicle towards the edge of the current lane using a bias offset. Once the autonomous vehicle is positioned at the bias offset within the current lane, vehicles in the adjacent lane are much more likely to slow down or stop in dense traffic situations in order to let the autonomous vehicle enter the adjacent lane. The solution provided by the present system enables very much more efficient navigation of an autonomous vehicle, thereby reducing computing resources used by the system to navigate the autonomous vehicle to a destination.

FIG. 1 is a block diagram of an autonomous vehicle. The autonomous vehicle 110 of FIG. 1 includes a data processing system 125 in communication with an inertia measurement unit (IMU) 105, cameras 110, radar 115, and lidar 120. Data processing system 125 may also communicate with acceleration 130, steering 135, breaks 140, battery system 145, and propulsion system 150. The data processing system and the components to communicate with are intended to be exemplary for purposes of discussion. It is not intended to be limiting, and additional elements of an autonomous vehicle may be implemented in a system of the present technology, as will be understood by those of ordinary skill in the art.

IMU 105 may track and measure the autonomous vehicle acceleration, yaw rate, and other measurements and provide that data to data processing system 125.

Cameras 110, radar 115, and lidar 120 may form all or part of a perception component of autonomous vehicle 110. The autonomous vehicle may include one or more cameras 110 to capture visual data inside and outside of the autonomous vehicle. On the outside of the autonomous vehicle, multiple cameras may be implemented. For example, cameras on the outside of the vehicle may capture a forward-facing view, a rear facing view, and optionally other views. Images from the cameras may be processed to detect objects such as streetlights, stop signs, lines or borders of one or more lanes of a road, and other aspects of the environment for which an image may be used to better ascertain the nature of an object than radar. To detect the objects, pixels of images are processed to recognize objects, and singular images and series of images. The processing may be performed by image and video detection algorithms, machine learning models which are trained to detect particular objects of interest, and other techniques.

Radar 115 may include multiple radar sensing systems and devices to detect objects around the autonomous vehicle. In some instances, a radar system may be implemented at one or more of each of the four corners of the vehicle, a front of the vehicle, a rear of the vehicle, and on the left side and right side of the vehicle. The radar elements may be used to detect stationary and moving objects in adjacent lanes as well as in the current lane in front of and behind the autonomous vehicle. Lidar may also be used to detect objects in adjacent lanes, as well as in front of and behind the current vehicle.

Data processing system 125 may include one or more processors, memory, and instructions stored in memory and executable by the one or more processors to perform the functionality described herein. In some instances, the data processing system may include a planning module, a control module, and a drive-by wire module. The modules communicate with each other to receive data from a perception component plan actions such as lane changes, and generate commands to execute lane changes. The data processing system 125 is discussed in more detail below with respect to the system of FIG. 2.

Acceleration 130 may receive commands from the data processing system to accelerate. Acceleration 130 may be implemented as one or more mechanisms to apply acceleration to the propulsion system 150. Steering module 135 controls the steering of the vehicle, and may receive commands to steer the vehicle from data processing system 135. Brake system 140 may handle braking applied to the wheels of autonomous vehicle 110, and may receive commands from data processing system 125. Battery system 145 may include a battery, charging control, battery management system, and other modules and components related to a battery system on an autonomous vehicle. Propulsion system 150 may manage and control propulsion of the vehicle, and may include components of a combustion engine, electric motor, drivetrain, and other components of a propulsion system utilizing an electric motor with or without a combustion engine.

Figure 2:
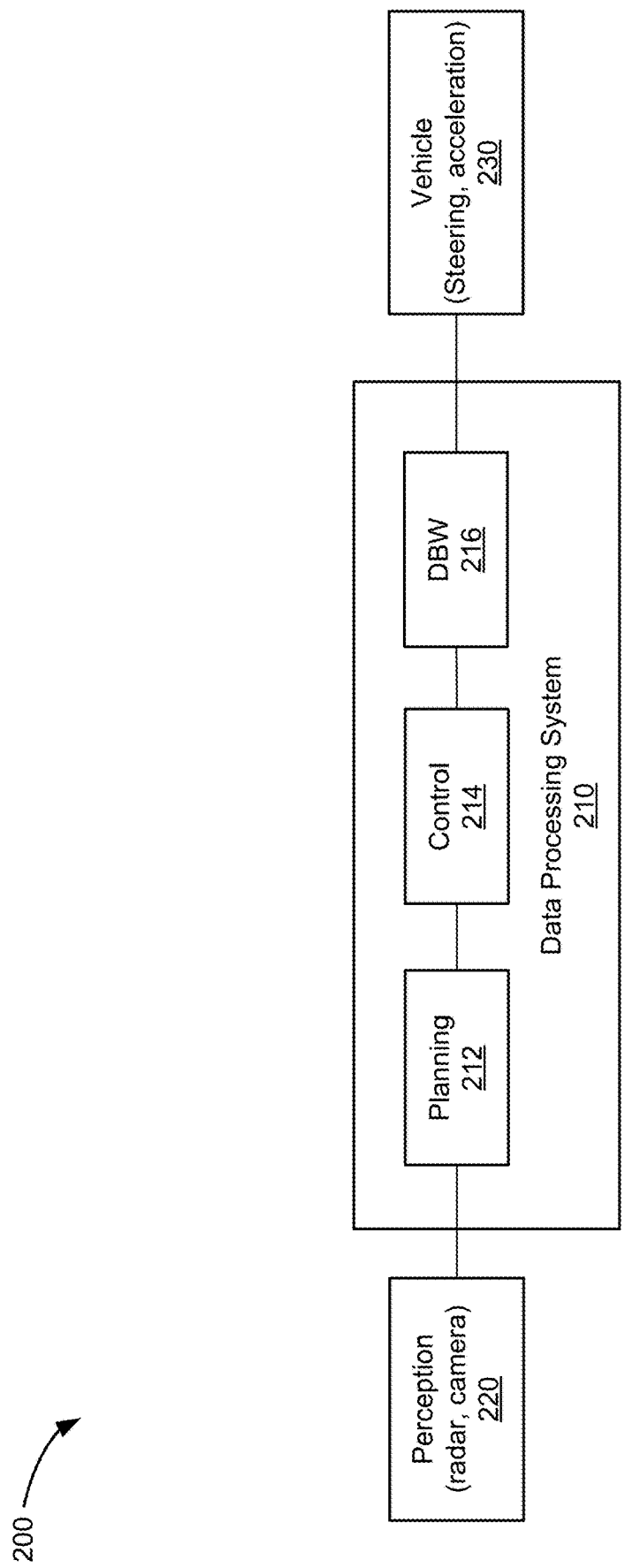
FIG. 2 is a block diagram of a data processing system within an autonomous vehicle.

FIG. 2 is a block diagram of a data processing system within an autonomous vehicle. Data processing system 210 provides more detail for data processing system 125 of the system of FIG. 1. Data processing system may receive data and information from perception component to 20. Perception component 220 may include radar and camera elements, as well as logic for processing the radar and camera output to identify objects of interest, lane lines, and other elements. Perception 220 may provide a list of objects and lane detection data to planning module 212.

Planning module 212 may receive and process data and information received from the perception component to plan actions for the autonomous vehicle. The actions may include navigating from the center of the lane to an adjacent lane using a bias distance, navigating from a current lane to adjacent lane, stopping, accelerating, turning, and performing other actions. Planning module 212 may generate samples of trajectories between two lines or points, analyze and select the best trajectory, and provide a best trajectory for navigating from one point to another to control 214.

Control module may receive information from the planning module, such as a selected trajectory over which a lane change should be navigated. Control module 214 may generate commands to be executed in order to navigate the selected trajectory. The commands may include instructions for accelerating, breaking, and turning to effectuate navigation along the best trajectory.

Drive-by wire module 216 may receive the commands from control 214 and actuate the autonomous vehicle navigation components based on the commands. In particular, drive-by wire 216 may control the accelerator, steering wheel, brakes, turn signals, and other optionally other components 230 of the autonomous vehicle.

Figure 3:
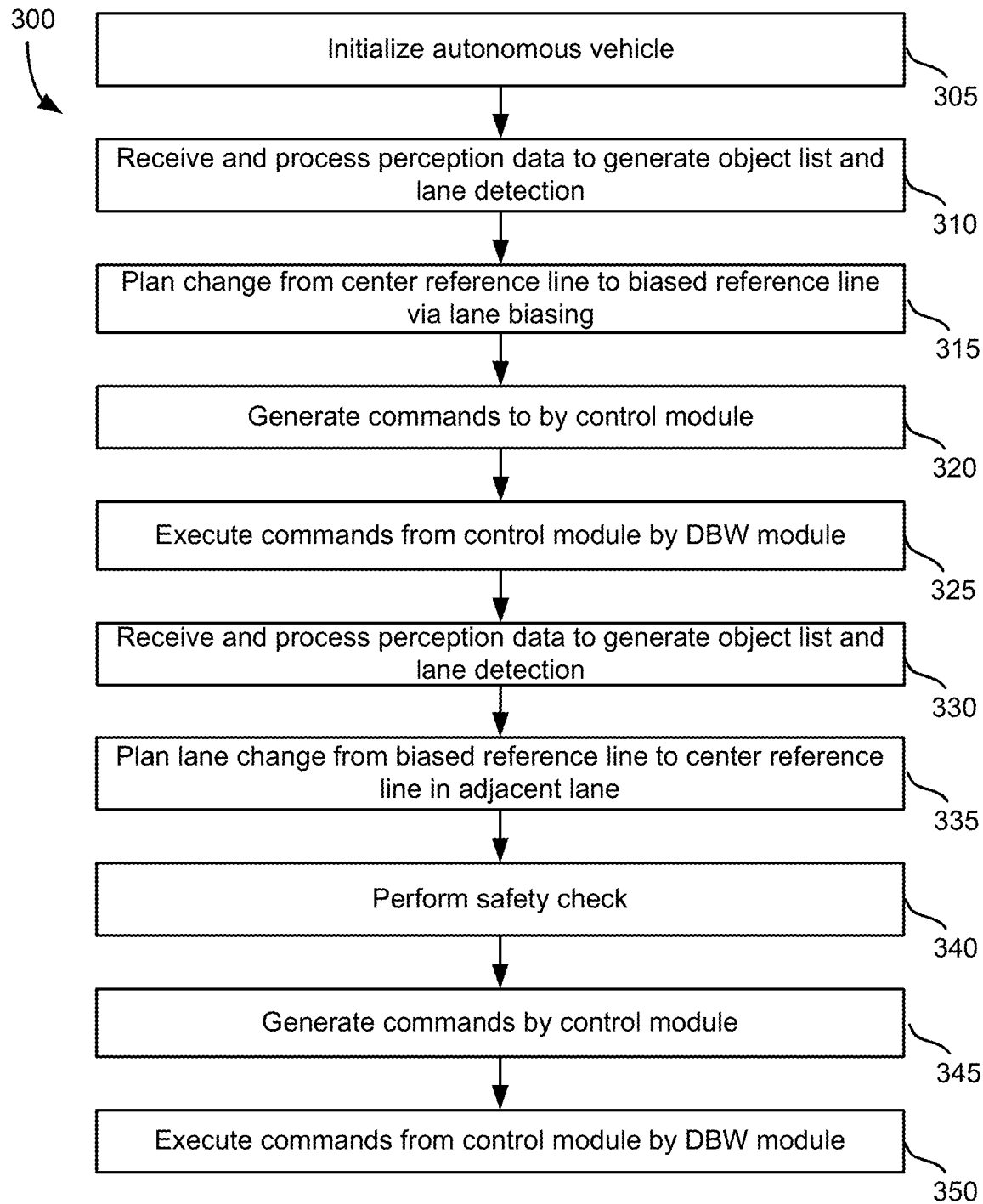
FIG. 3 is a method for implementing a lane change using a bias offset by an autonomous vehicle.

FIG. 3 is a method for implementing a lane change using a bias offset by an autonomous vehicle. The autonomous vehicle is initialized at step 305. Initializing the autonomous vehicle may include starting the autonomous vehicle, performing an initial system check, calibrating the vehicle to the current ambient temperature and weather, and calibrating any systems as needed at startup.

Perception data is received and processed to generate an object list and lane detection data at step 310. Perception data may include image data from one or more cameras, data received from one or more radars and lidar, and other data. The perception data may be received by the perception component and may be processed by logic associated with the perception component. Once the object list and lane detection data are generated, they are provided to the data processing system. More details for receiving and processing perception data is discussed with respect to the method of FIG. 4.

In response to receiving the object lesson lane detection data, the data processing system may plan a change from a center reference line of a current lane to a bias reference line of the current lane using a lane bias at step 315. Planning a change from a center reference line to a bias reference line may include generating a plurality of sampled trajectories, analyzing trajectory to determine the best one, and selecting the best trajectory. More details for planning a change from a center reference line to a bias reference line is discussed in more detail below with respect to the method of FIG. 5.

Once the planning module generates a selected trajectory from a center reference line to a bias reference line, the directory line is provided to a control module. The control module generates commands to navigate the autonomous vehicle along the selected trajectory at step 320. The commands may include how and when to accelerate the vehicle, apply braking by the vehicle, and the angle of steering to apply to the vehicle and at what times. The commands are provided by the control module to the drive-by wire module. The generated commands are executed by the drive-by wire module at step 325. The drive-by wire module may control the autonomous vehicle brakes, acceleration, and steering wheel, based on the commands received from the control module. By executing the commands, the drive-by wire module makes the autonomous vehicle proceed along the selected trajectory from the center reference line to the bias reference line within the current lane.

Once the autonomous vehicle has navigated to the bias reference line, perception data is received and processed to generate an object list and lane detection at step 330. In some instances, receiving and processing perception data is performed on an ongoing basis, and the listed order of step 305 and 330 is for purposes of discussion only with respect to method of FIG. 3.

A lane change from the bias reference lane to a center reference lane in the adjacent lane is planned at step 335. Perception data is received and processed to identify objects in the adjacent lane, boundaries of the detected adjacent lane, and objects within and boundaries of the current lane. Planning a lane change from the bias reference line to the center reference line may be similar to planning the lane change from the center reference line to the bias reference line, except that different reference lines are used in the planning. For example, at step 335, a plurality of sampled trajectories is generated for navigating from the bias reference line to the center reference line of the adjacent lane. Each of the trajectories are evaluated and ranked, such as for example using objects along each trajectory, constraint considerations, and the cost of each sample trajectory. Scores are assigned to each trajectory based on the objects, constraints, and costs, and the high-strength trajectory is selected.

A safety check is performed at step 340. A safety check may include confirming all obstacles exist along the selected trajectory, no collisions will occur along the selected trajectory, and that the autonomous vehicle can physically navigate along the selected trajectory.

Before generated commands to execute a lane change, the autonomous vehicle may wait for a minimum period of time before proceeding with a lane change. The minimum amount of time is intended to allow vehicles in the adjacent lane to see that the autonomous vehicle, which has a turn signal on and is positioned near the edge of the lane with an offset bias, intends to change lanes into the adjacent lane. By seeing the turn signal and the biased position of the vehicle near the adjacent lane, drivers of vehicles in the adjacent lane can slow down or stop to provide more space for the autonomous vehicle to change into the adjacent lane.

Commands are generated by the control module in response to receiving the selected trajectory at step 345. The commands implement the acceleration, breaking, and steering needed to navigate the autonomous vehicle on the selected trajectory. The commands are received by the drive-by wire module from the control module and are executed by the drive-by wire module at step 350. As a result of executing the commands, the autonomous vehicle navigates along the selected path from the bias reference line to the center reference line in the adjacent lane. The lane change from an original lane to the adjacent lane using a bias offset to indicate a lane change in tension is now complete.

Figure 4:
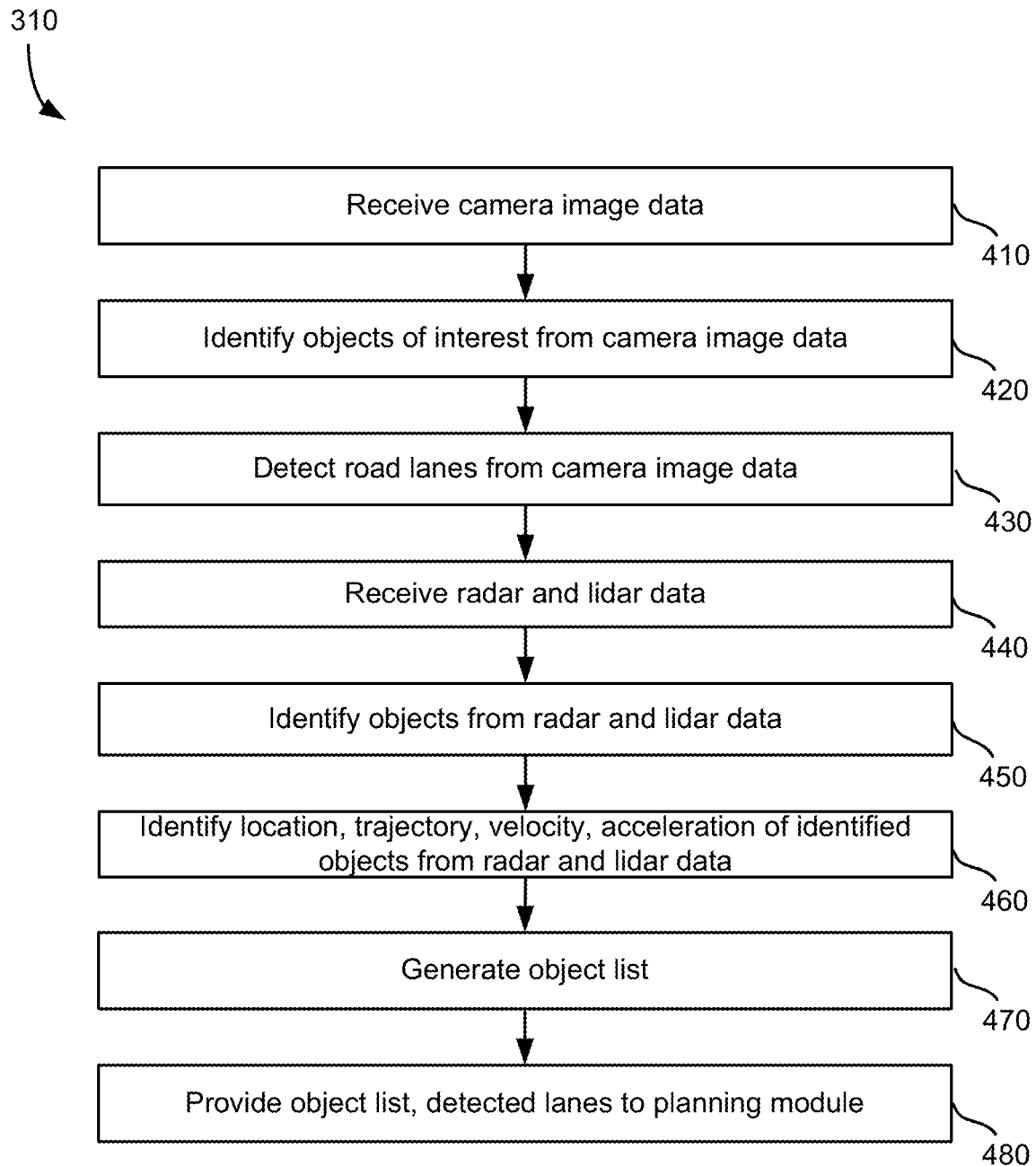
FIG. 4 is a method for receiving and processing perception data to generate an object list and lane detection data.

FIG. 4 is a method for receiving and processing perception data to generate an object list and lane detection data. The method of FIG. 4 provides more detail for step 310 of the method of FIG. 3. First, camera image data is received at step 410. The camera image data may include images and/or video of the environment through which the autonomous vehicle is traveling. Objects of interest may be identified from the camera image and/or video data at step 420. Objects of interest may include a stop light, stop sign, other signs, and other objects of interest that can be recognized and processed by the data processing system. In some instances, image data may be processed using pixel clustering algorithms to recognize certain objects. In some instances, pixel data may be processed by one or more machine learning models are trained to recognize objects within images, such as traffic light objects, stop sign objects, other sign objects, and other objects of interest.

Road lanes are detected from the camera image data at step 430. Road lane detection may include identifying the boundaries of a particular road, path, or other throughway. The road boundaries and lane lines may be detected using pixel clustering algorithms to recognize certain objects, one or more machine learning models trained to recognize road boundary and lane line objects within images, or by other object detection methods.

Radar and lidar data are received at step 440, and the radar and lidar data may be processed to identify objects within the vicinity of the autonomous vehicle, such as between zero and several hundred feet of the autonomous vehicle. The processed radar and lidar data may indicate the speed, trajectory, velocity, and location of an object near the autonomous vehicle. Examples of objects detectable by radar and lidar include cars, trucks, people, and animals.

An object list of the objects detected via radar, lidar, and objects of interest from the camera image data is generated at step 470. For each object in the list, information may be included such as an identifier for the object, a classification of the object, location, trajectory, velocity, acceleration of the object, and in some instances other data. The object list, road boundaries, detected lanes is provided to a planning module at step 480.

Figure 5:
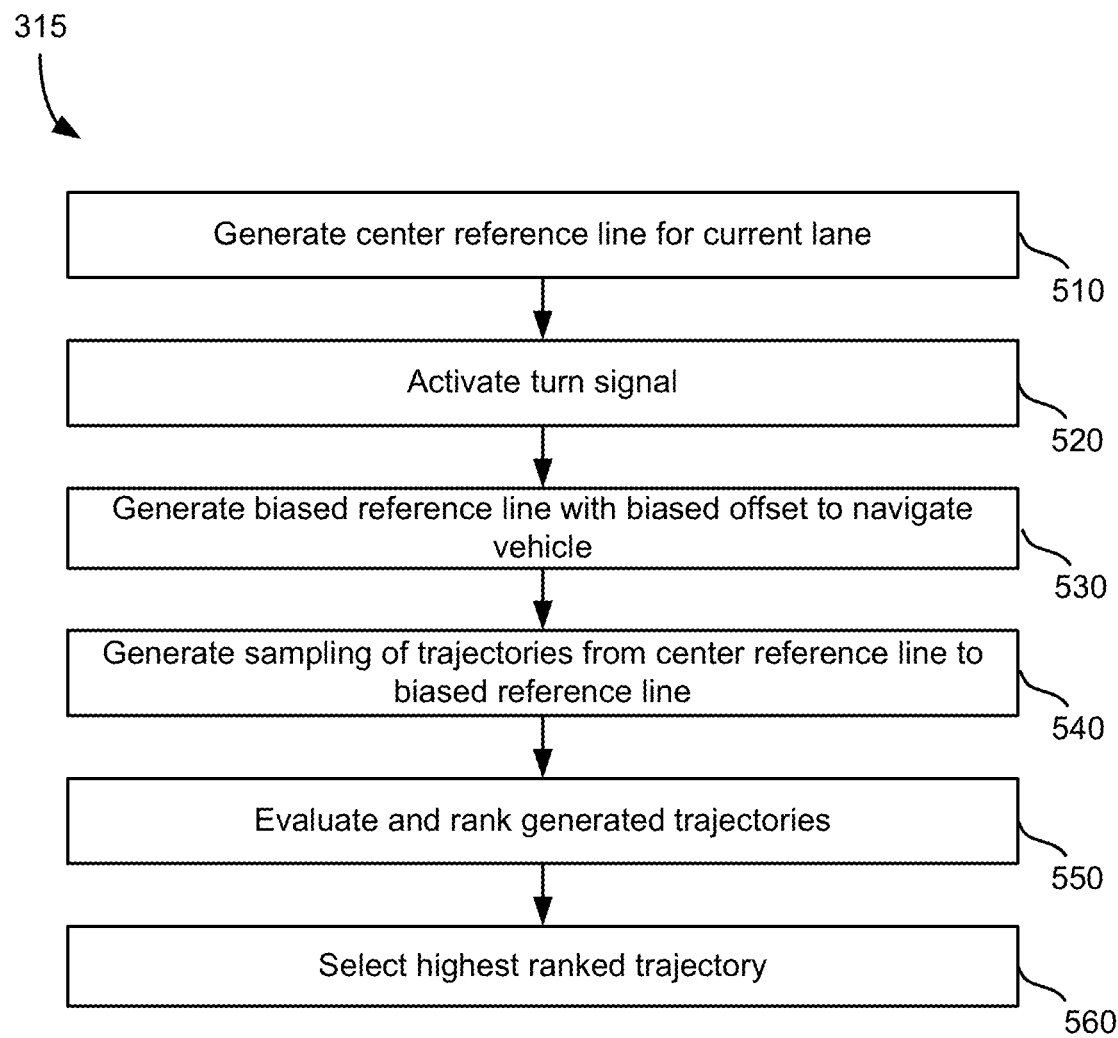
FIG. 5 is a method for planning a change from a center line to a biased reference line via lane biasing.

FIG. 5 is a method for planning a change from a center line to a biased reference line via lane biasing. The method of FIG. 5 provides more detail for step 315 of the method of FIG. 3. A center reference line for a current lane is generated at step 510. The center reference line is generated by detecting the center of the current lane, which is detected from camera image data. A turn signal is activated at step 520. A biased reference line with the bias offset is then generated at step 530. The biased reference line is a line at which the autonomous vehicle will be navigated to within the current lane in order to provide notice to vehicles and adjacent lanes that the autonomous vehicle intends to change lanes. More details for generating a biased reference line is discussed with respect to the method of FIG. 6.

A sampling of trajectories from the center reference line to the bias reference line is generated at step 540. The sampling of trajectories may include a variety of trajectories from the center reference to various points along the bias reference line. Each generated trajectory is evaluated and ranked at step 550. Evaluating each trajectory within the plurality of sample trajectory lines includes determining objects in each trajectory, determining constraint considerations, and determining the cost of each trajectory. Evaluating and ranking the generated trajectories is discussed in more detail below with respect to the method of FIG. 7. The highest ranked trajectory is selected at step 560 and provided by the play module to the control module.

Figure 6:
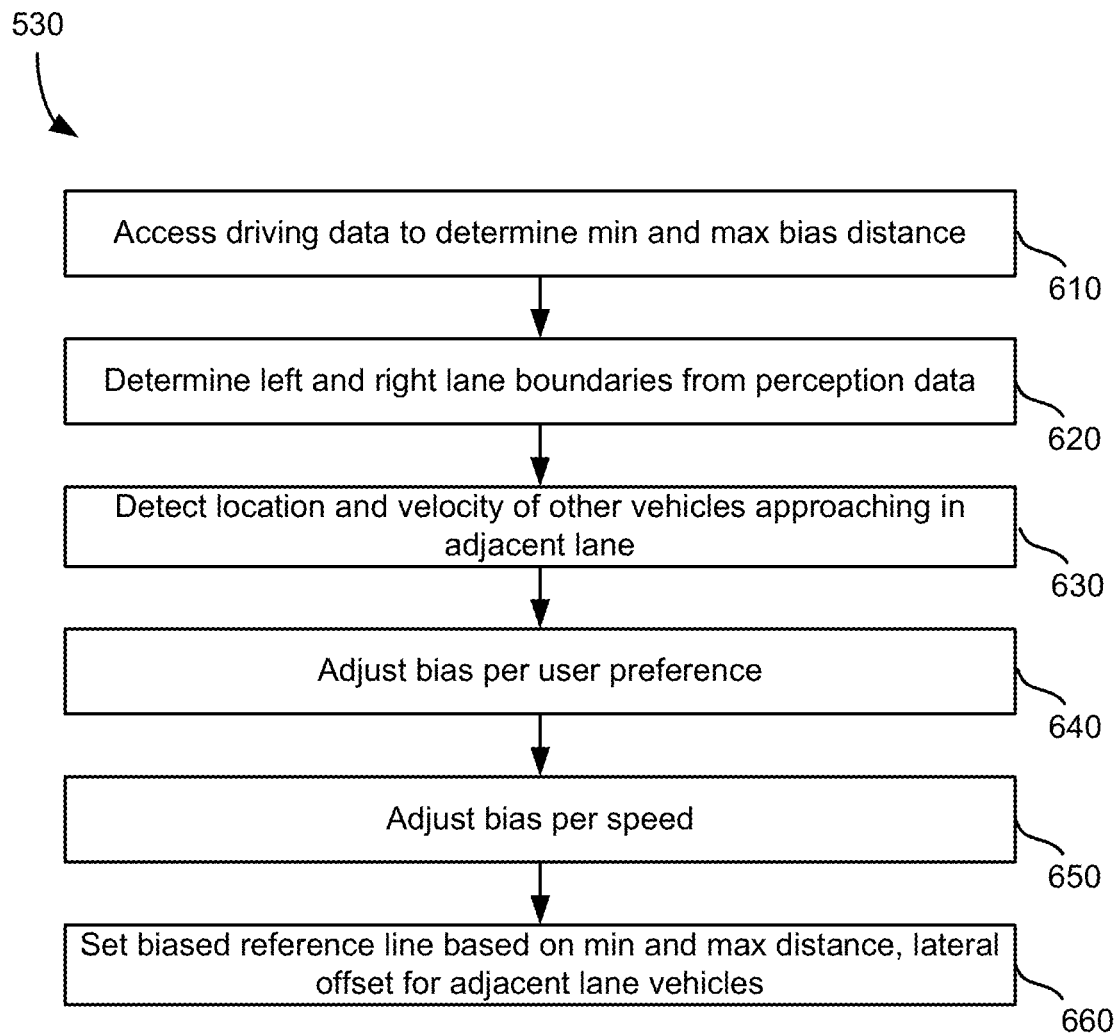
FIG. 6 is a method for generating a biased reference line with a biased offset.

FIG. 6 is a method for generating a biased reference line with a biased offset. The method of FIG. 6 provides more detail for step 530 the method of FIG. 5. Driving data is accessed to determine a minimum and maximum biased distance at step 610. The driving data may be retrieved from recordings of previous driver paths within a lane. In some instances, the behavior of previous drivers that position their vehicle towards a lane edge before completing a lane change is detected and used to determine the bias at which the autonomous vehicle should navigate to before completing the lane change. In some instances, the width of the present lane is used to determine a minimum bias distance and maximum bias distance. The minimum bias distance is a minimal change in vehicle position towards the lane boundary while the maximum bias distance is the maximum distance a vehicle may move within the current lane without crossing into the adjacent lane.

The left and right lane boundaries are determined from perception data at step 620. Location and velocity of other vehicles approaching in the adjacent lane are detected at step 630. A bias may be adjusted for a user preference at step 640. In some instances, the user may prefer to be closer to a lane edge, or further away from a lane edge when the autonomous vehicle moves to a bias line before changing lanes. The bias point may be adjusted per speed of the present vehicle at step 650. For example, when the autonomous vehicle is moving very slowly or any stop, the bias line may be positioned closer to the boundary of the lane. If the vehicle is moving more rapidly, the bias line may be positioned a bit further away from the boundary the lane for safety reasons. A biased reference line can be based on a minimum or maximum distance, lateral offset for adjacent lane vehicles, user preference, and vehicle speed, at step 660. In some instances, at points where the vehicle is in the adjacent lane, the autonomous vehicle may be moved from the maximum bias offset to the minimum bias offset from the center of the lane. This is illustrated in more detail in the illustration of FIG. 10.

Figure 7:
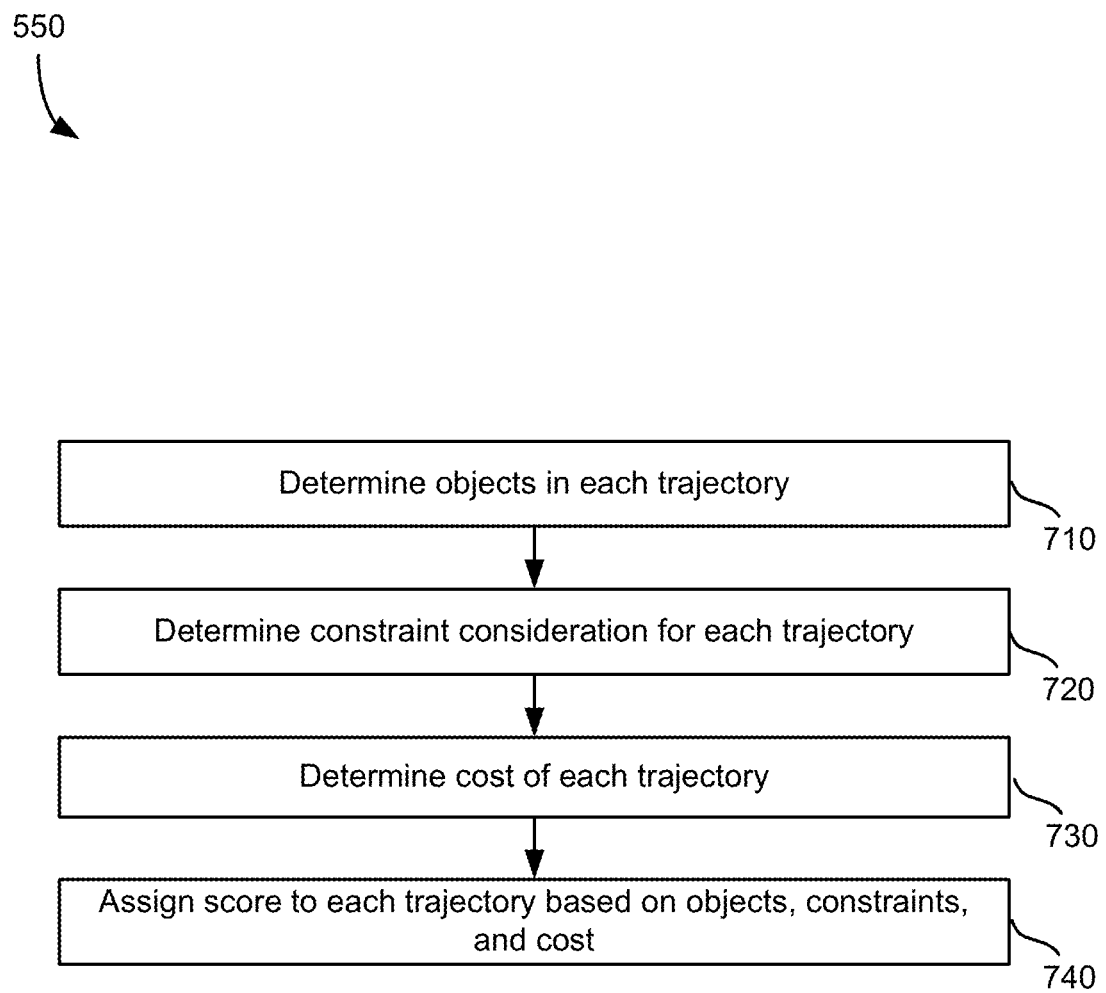
FIG. 7 is a method for evaluating and ranking generated trajectories.

FIG. 7 is a method for evaluating and ranking generated trajectories. The method of FIG. 7 provides more detail for step 550 of the method of FIG. 5. For each factor in the ranking of a trajectory, the ranking is increased or decreased based on the outcome of a determination. For example, if a determination suggests that a trajectory may not be safe, the ranking may be cut in half or reduced by a certain percentage. In some instances, some determinations may have a higher weighting than others, such as for example objects detected to be in the particular trajectory.

Any objects are determined to be in a trajectory are identified at step 710. When an object is determined to be in a particular trajectory, the ranking of that battery is reduced, in order to avoid collisions with the object while navigating the particular trajectory. Concerning considerations for each trajectory are determined at step 720. In some instances, one or more constraints may be considered for each trajectory. The constraints may include a lateral boundary, lateral offset, lateral speed, lateral acceleration, lateral jerk, and curvature of lane lines. Each constraint may increase or reduce the ranking of a particular trajectory based on the value of a constraint and thresholds associated with each particular constraint. A cost of each sample trajectory is determined at step 730. Examples of costs include a terminal offset cost, average offset costs, lane change time duration cost, lateral acceleration costs, and lateral jerk cost. When determining a cost, the ranking may be decreased if a particular cost-a threshold or out of a range, and the ranking may be increased if the cost is below a threshold, or within a desired range. A score is assigned to each trajectory based on analysis of the objects in the trajectory, constraints considered for the trajectory, and costs associated with each trajectory.

Figure 8:
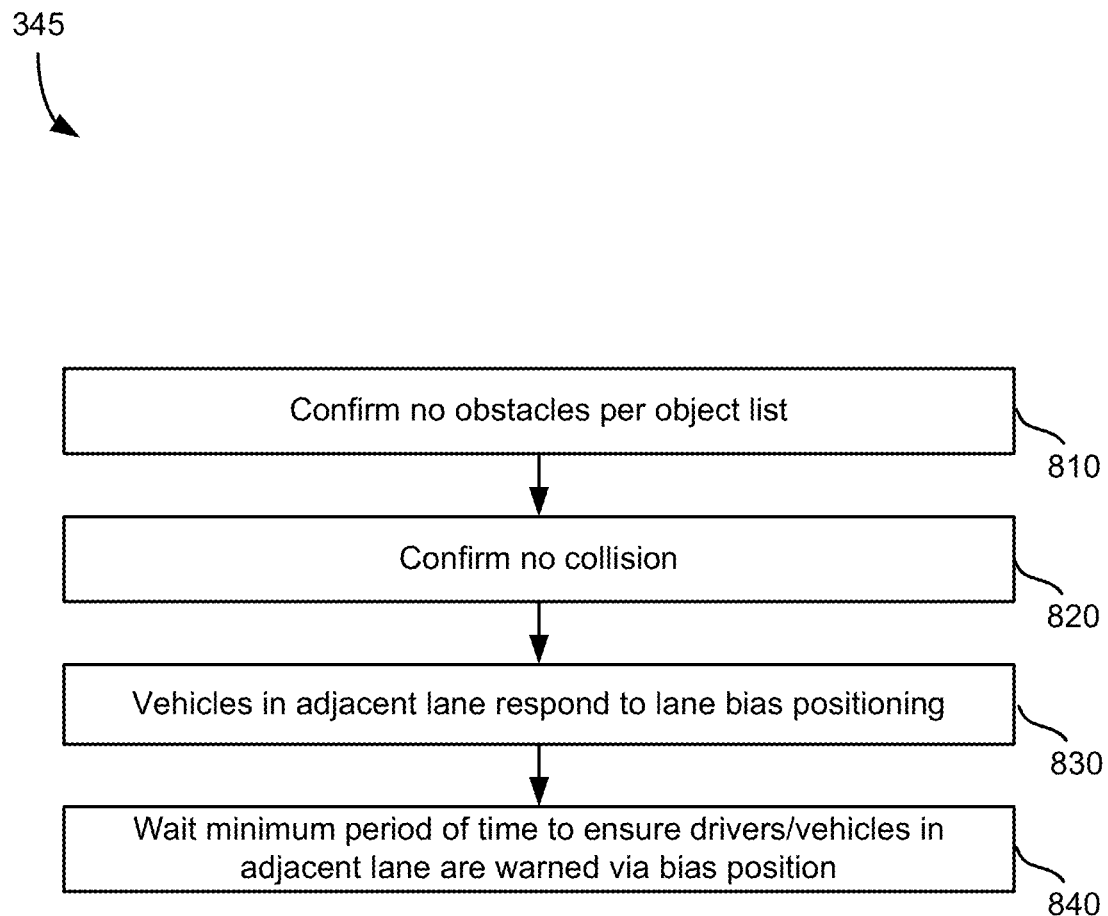
FIG. 8 is a method for performing a safety check.

FIG. 8 is a method for performing a safety check. Performing a safety check for the method of FIG. 8 provides more detail for step 345 of the method of FIG. 3. First, the data processing system confirms that there are no obstacles along the selected trajectory at step 810. The system may confirm that the objects in the object list are not positioned in the trajectory as well as any new objects detected by radar, lidar, or camera data. The confirmation that no collisions will occur is confirmed at step 820. Collisions may be detected to occur if an unexpected curvature in the road occurs, an unexpected boundary within a road is detected, or some other unforeseen obstacle appears in the selected trajectory. After moving from the center reference line to the bias reference line within the current lane, drivers of vehicles in the adjacent lane will likely respond to the lane bias positioning at step 830 by slowing down and/or stopping within their lane to make room for the autonomous vehicle to change lanes. The autonomous vehicle waits a minimum period of time to ensure drivers and vehicles in the adjacent lane have been warned or put on notice by the bias change in position at step 840. Rather than move from the center reference line to the bias reference line, and then immediately move from the bias reference line to the center reference line of the adjacent lane, the autonomous vehicle will wait a short period of time, such as at least three seconds, before moving from the bias reference line to the adjacent lane center reference line.

Figure 9:
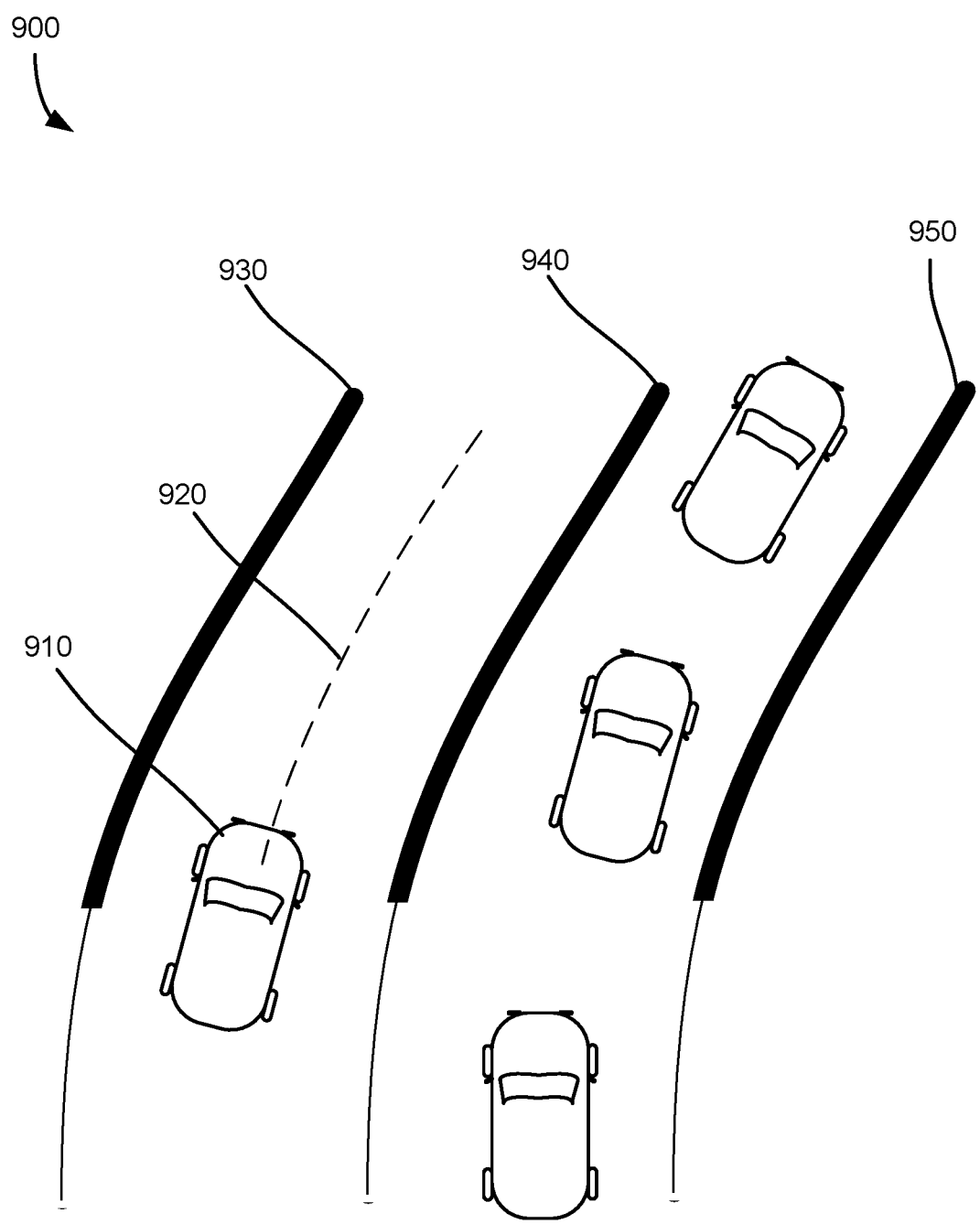
FIG. 9 illustrates a center reference line in a current lane.

The process of executing an intentional way or lane change from a center reference line of one lane to a center reference line of an adjacent lane will now be discussed with reference to the images of FIGS. 9-16. FIG. 9 illustrates a center reference line in a current lane. In the illustration 900 of FIG. 9, the data processing system of autonomous vehicle 910 detects lane boundaries 930, 940 and 950. The data processing system then generates center reference line 920 within the current lane of autonomous vehicle 910.

Figure 10:
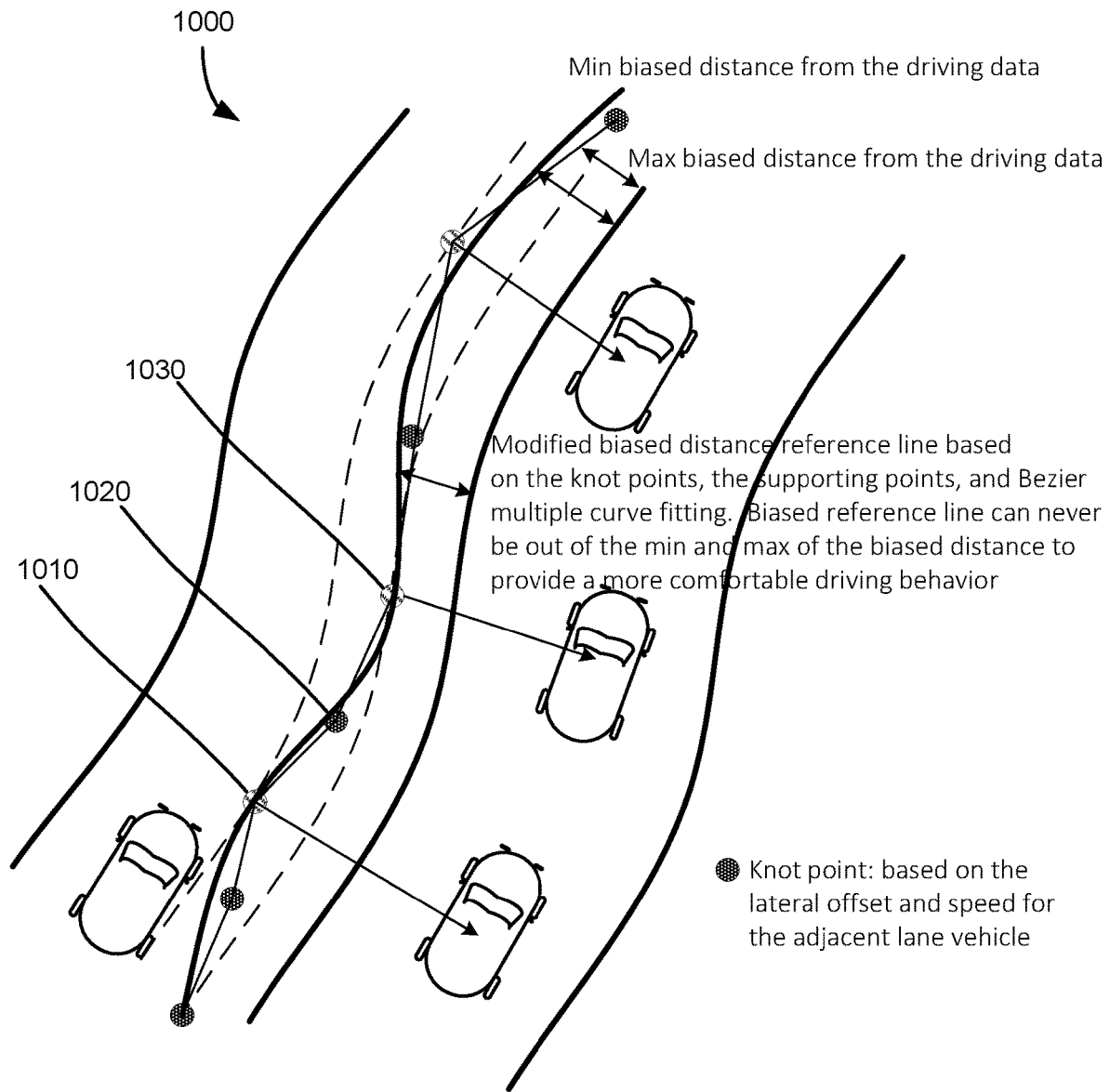
FIG. 10 illustrates a bias reference line having a minimum and maximum bias distance.

FIG. 10 illustrates a bias reference line having a minimum and maximum bias distance. In some instances, a different bias may be used to implement the bias reference line with respect to the center reference line. The bias reference line may have a minimum bias distance and a maximum bias distance with respect to the center reference line of a current lane. At position 1010 along the bias reference line, the reference line is positioned closer to the minimum bias distance due to the presence of a vehicle close to the lane boundary in the adjacent lane at that position. At position 1130 along the bias reference line, the bias reference line is at the maximum bias distance from the center reference line because a vehicle the adjacent lane is further away from the lane boundary. Position 1020 along the bias reference line is selected to provide the smoothest trajectory between points 1010 and 1030.

Figure 11:
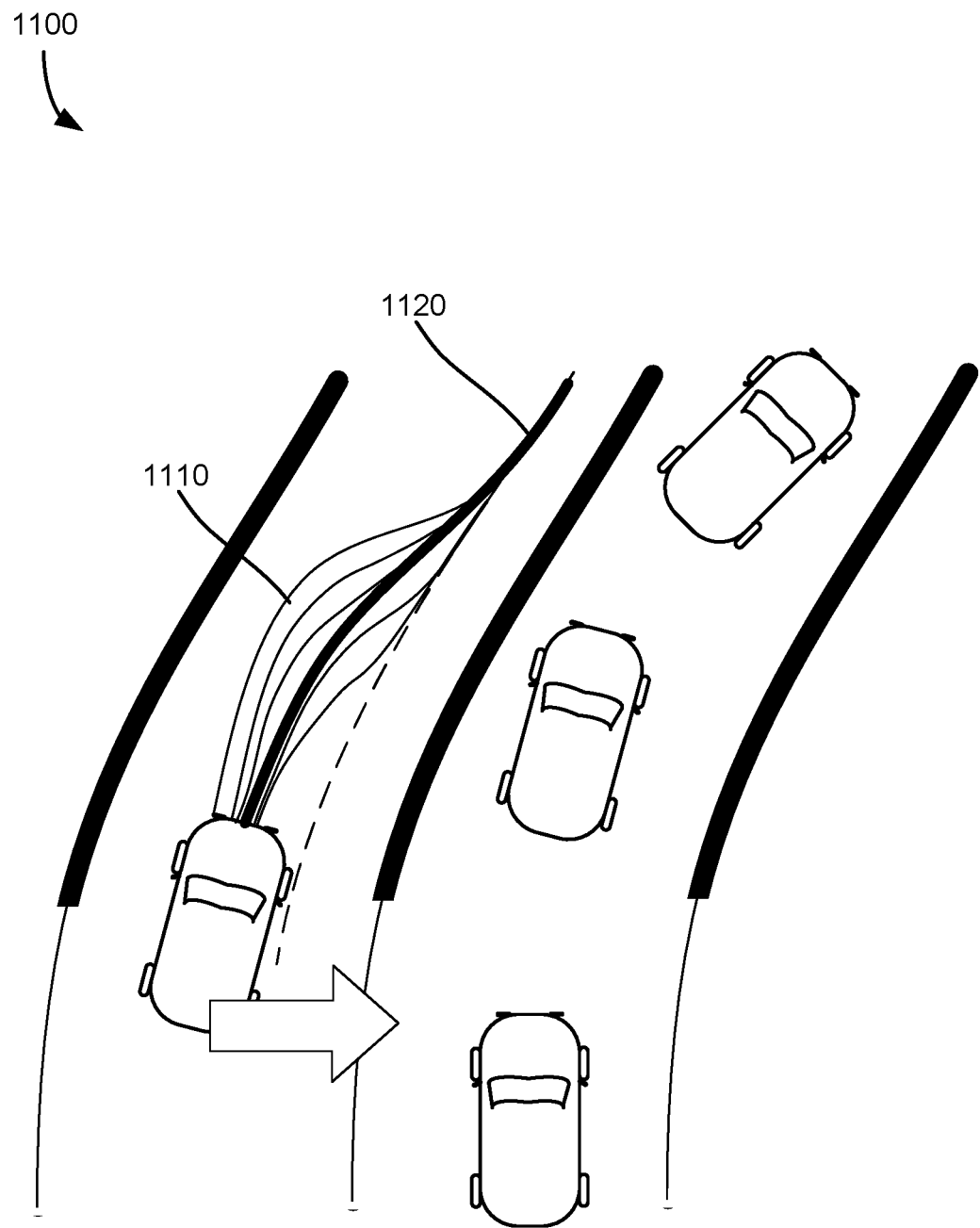
FIG. 11 illustrates a sampling of trajectories between a center reference line and a bias reference line.

FIG. 11 illustrates a sampling of trajectories between a center reference line and a bias reference line. As shown in illustration of FIG. 11, multiple trajectories 1110 are generated along which an autonomous vehicle may navigate from a center reference line to a bias reference line. A best trajectory 1120 of the multiple trajectories may be selected along which the autonomous vehicle may navigate from the center reference line to the bias reference line.

Figure 12:
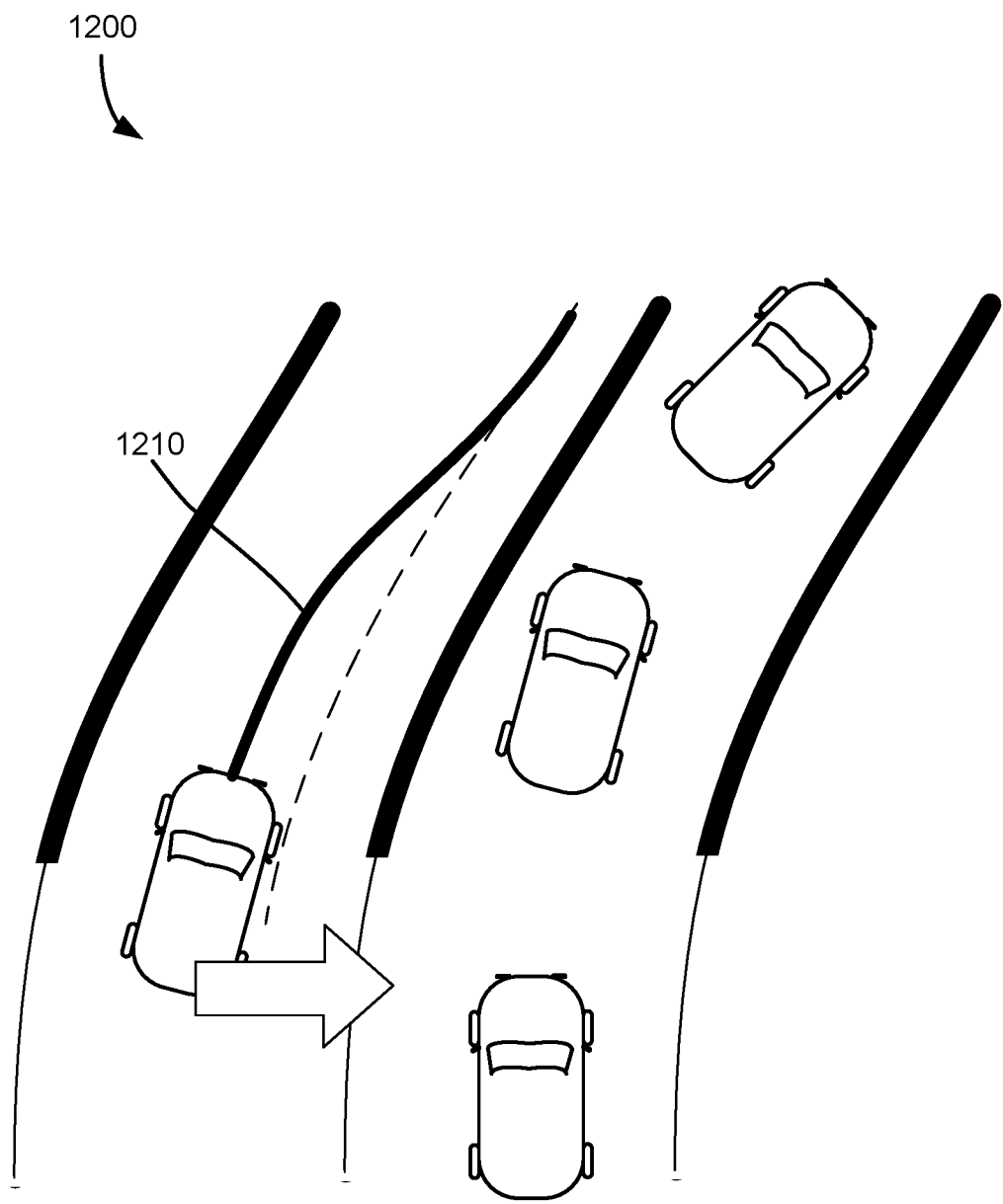
FIG. 12 illustrates a selected trajectory between a center reference line and a bias reference line.

Once the best trajectory is selected, the autonomous vehicle may turn on a turn signal and navigate along the selected trajectory 1210 as illustrated in FIG. 12.

Figure 13:
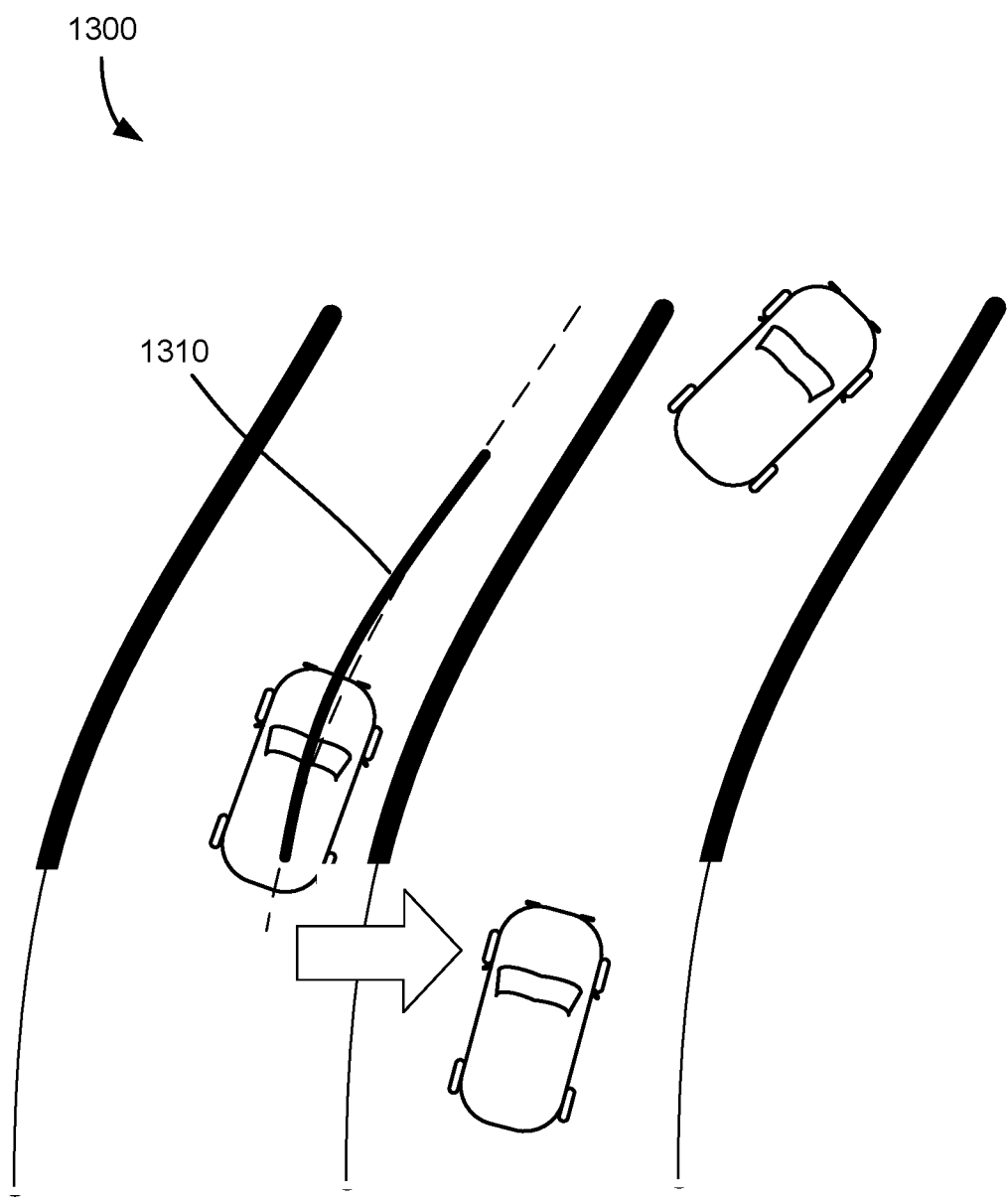
FIG. 13 illustrates a vehicle navigating from a center reference line to a selected bias reference line.

Illustrations of FIGS. 9-12 show dense traffic in the lane adjacent to the current Lane, including cars directly adjacent to the autonomous vehicle. Once the autonomous vehicle navigates to the bias position within the current lane, it can be seen in FIG. 13 that one or more cars are likely to make space for the autonomous vehicle to enter the adjacent lane. Once the vehicle is at the bias reference line, the vehicle may plan to change into the adjacent lane as indicated in the illustration of FIG. 13.

Figure 14:
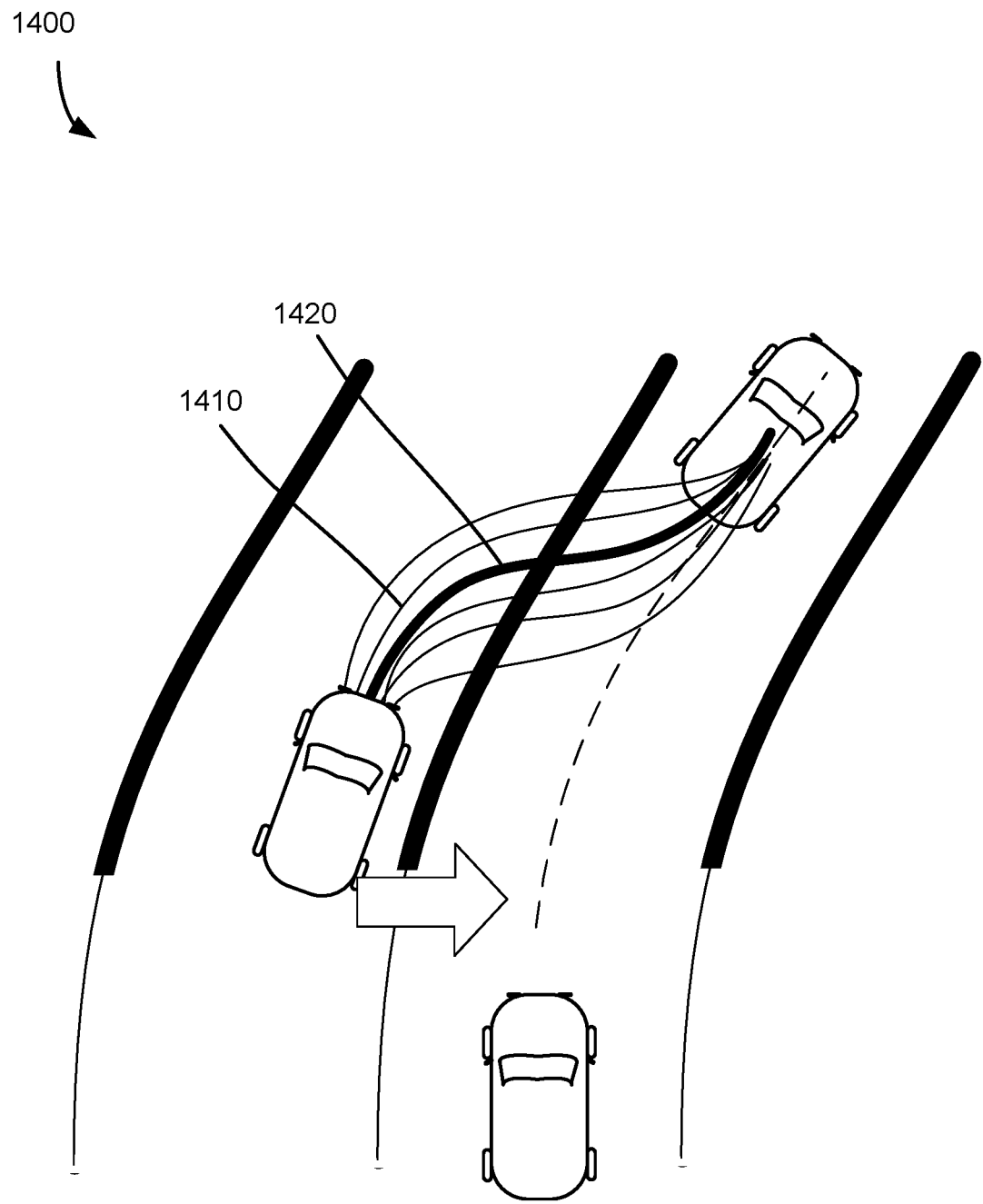
FIG. 14 illustrates a sampling of trajectories between a bias reference line and a center reference line in an adjacent lane.
Figure 15:
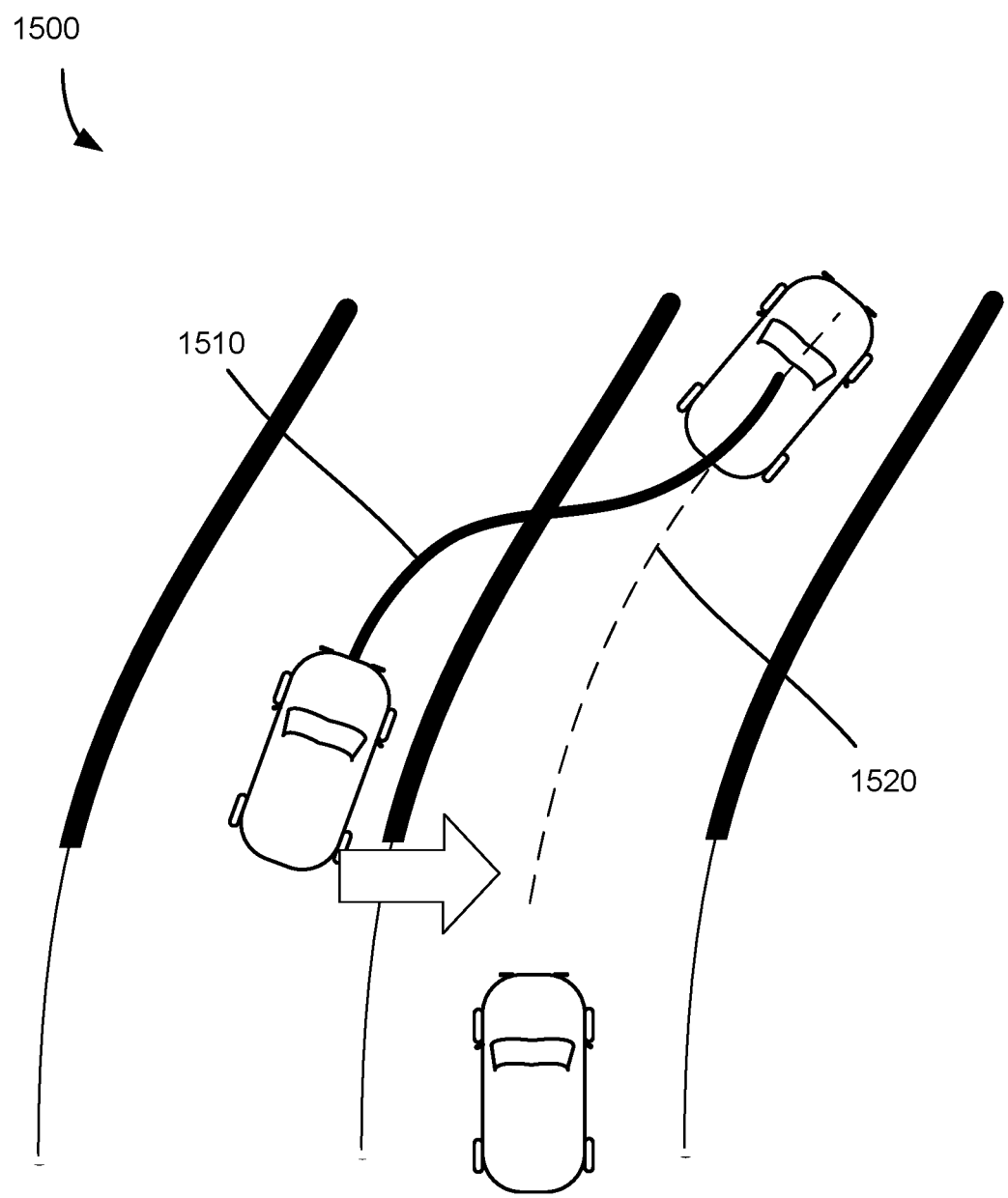
FIG. 15 illustrates a selected trajectory between a bias reference line and a center reference line.
Figure 16:
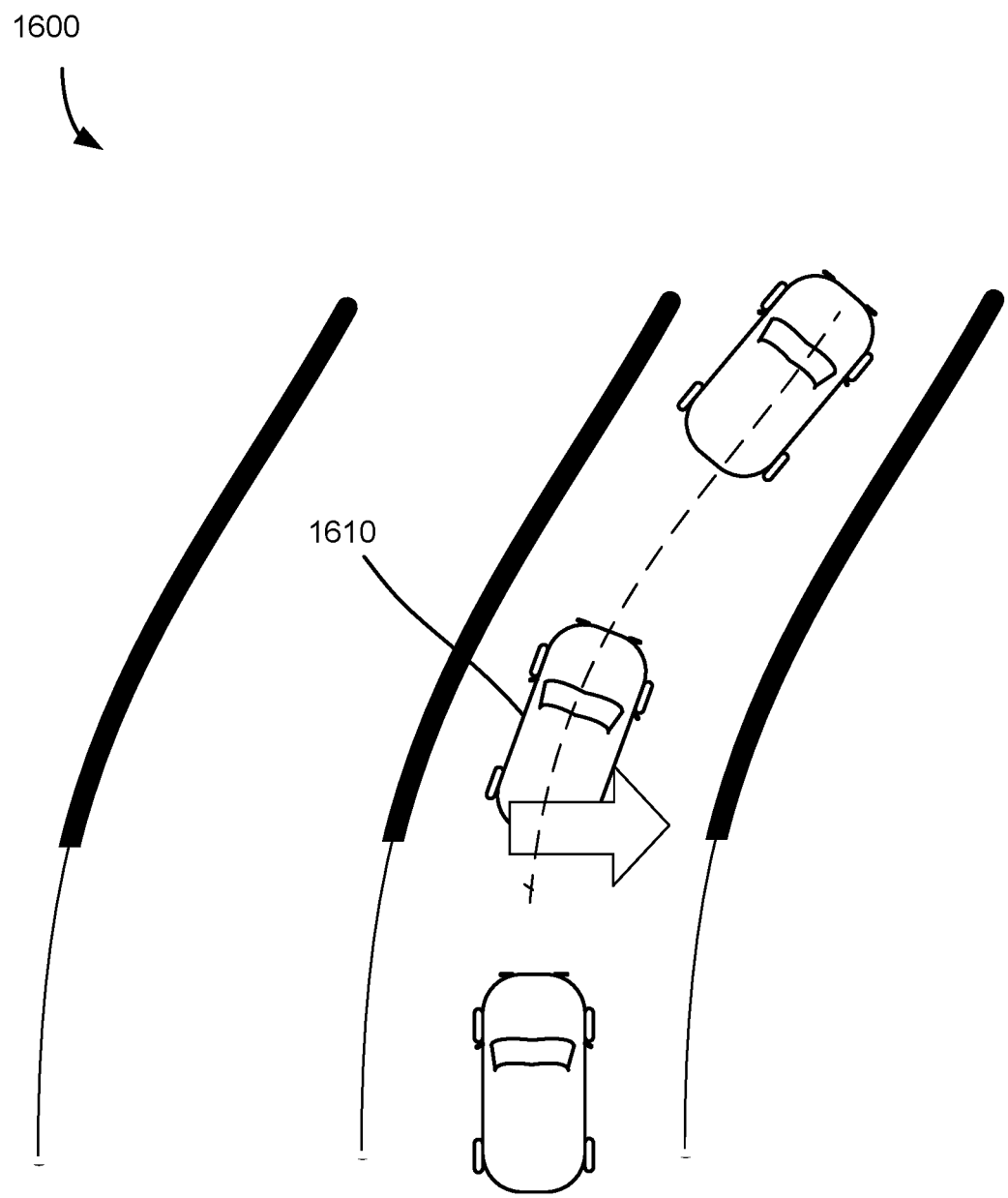
FIG. 16 illustrates a vehicle that has completed navigation along a selected trajectory between a bias reference line and a center reference line.

FIG. 14 illustrates a sampling of trajectories between a bias reference line and a center reference line in an adjacent lane. The data processing system may generate a sampling of trajectories 1410 from the bias reference line to the center reference line of the adjacent lane. The data processing system may select the best trajectory 1420 along which the autonomous vehicle will navigate into the adjacent lane. When the best trajectory is selected, the autonomous vehicle may navigate along the selected trajectory as shown in FIG. 15 until the vehicle is safely in the adjacent lane along the center reference line as illustrated in FIG. 16

Figure 17:
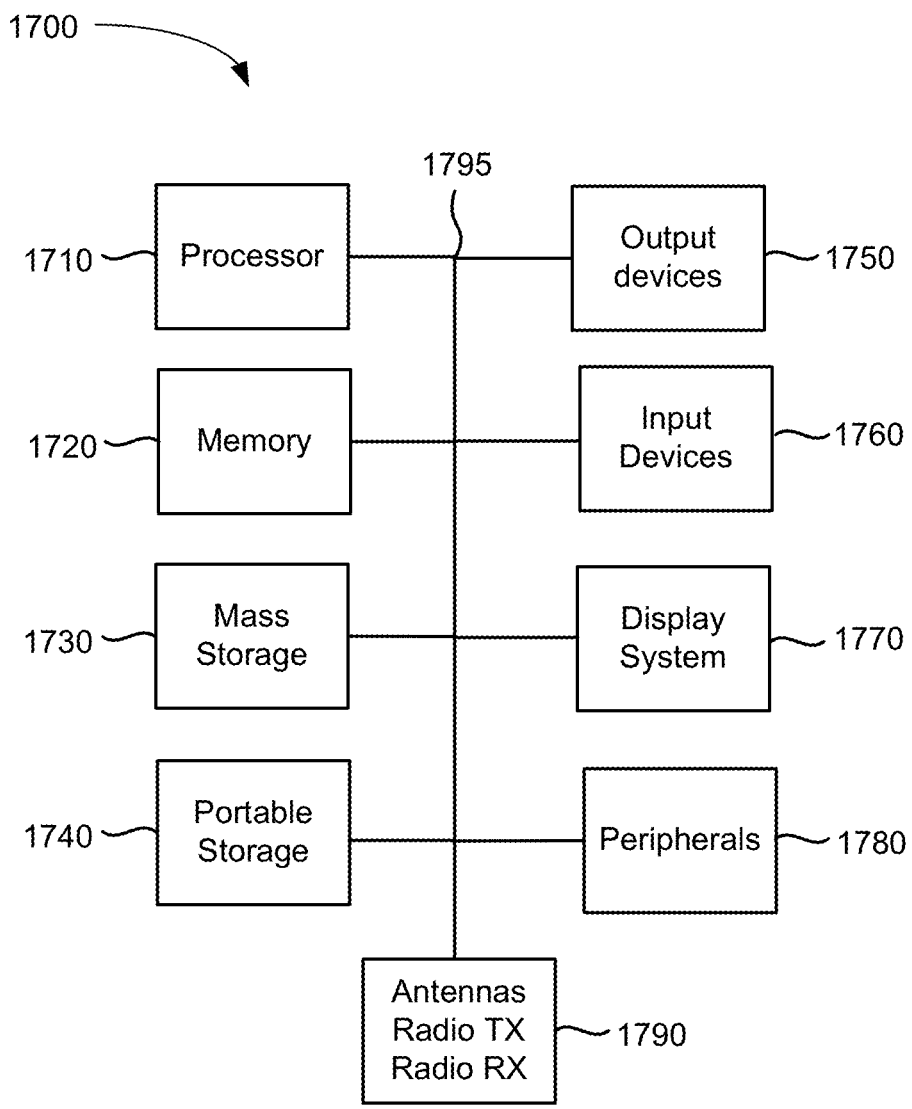
FIG. 17 is a block diagram of a computing environment for implementing a data processing system.

FIG. 17 is a block diagram of a computing environment for implementing a data processing system. System 1700 of FIG. 17 may be implemented in the contexts a machine that implements data processing system 125 on an autonomous vehicle. The computing system 1700 of FIG. 17 includes one or more processors 1710 and memory 1720. Main memory 1720 stores, in part, instructions and data for execution by processor 1710. Main memory 1720 can store the executable code when in operation. The system 1700 of FIG. 17 further includes a mass storage device 1730, portable storage medium drive(s) 1740, output devices 1750, user input devices 1760, a graphics display 1770, and peripheral devices 1780.

The components shown in FIG. 17 are depicted as being connected via a single bus 1790. However, the components may be connected through one or more data transport means. For example, processor unit 1710 and main memory 1720 may be connected via a local microprocessor bus, and the mass storage device 1730, peripheral device(s) 1780, portable storage device 1740, and display system 1770 may be connected via one or more input/output (I/O) buses.

Mass storage device 1730, which may be implemented with a magnetic disk drive, an optical disk drive, a flash drive, or other device, is a non-volatile storage device for storing data and instructions for use by processor unit 1710. Mass storage device 1730 can store the system software for implementing embodiments of the present technology for purposes of loading that software into main memory 1720.

Portable storage device 1740 operates in conjunction with a portable non-volatile storage medium, such as a flash drive, USB drive, memory card or stick, or other portable or removable memory, to input and output data and code to and from the computer system 1700 of FIG. 17. The system software for implementing embodiments of the present technology may be stored on such a portable medium and input to the computer system 1700 via the portable storage device 1740.

Input devices 1760 provide a portion of a user interface. Input devices 1760 may include an alpha-numeric keypad, such as a keyboard, for inputting alpha-numeric and other information, a pointing device such as a mouse, a trackball, stylus, cursor direction keys, microphone, touch-screen, accelerometer, wireless device connected via radio frequency, motion sensing device, and other input devices. Additionally, the system 1700 as shown in FIG. 17 includes output devices 1750. Examples of suitable output devices include speakers, printers, network interfaces, speakers, and monitors.

Display system 1770 may include a liquid crystal display (LCD) or other suitable display device. Display system 1770 receives textual and graphical information and processes the information for output to the display device. Display system 1770 may also receive input as a touch-screen.

Peripherals 1780 may include any type of computer support device to add additional functionality to the computer system. For example, peripheral device(s) 1780 may include a modem or a router, printer, and other device.

The system of 1700 may also include, in some implementations, antennas, radio transmitters and radio receivers 1790. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 1700 of FIG. 17 are those typically found in computer systems that may be suitable for use with embodiments of the present invention and are intended to represent a broad category of such computer components that are well known in the art. Thus, the computer system 1700 of FIG. 17 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

The invention claimed is:

1. A system for automatically navigating a vehicle between lanes using a bias offset, comprising:
   a data processing system comprising one or more processors, memory, a planning module, and a control module, the data processing system to:
   generate a first reference line in a current lane from received sensor data;
   generate a biased reference line in the current lane with a bias offset from the received sensor data, wherein generating a biased reference line include generating a maximum bias offset and a minimum bias offset greater than zero, wherein the biased reference line is generated between the maximum bias offset and the minimum bias offset based on a location of other vehicles;
   select a best trajectory from a plurality of trajectories from the first reference line to the biased reference line;
   generate one or more commands to navigate the vehicle from the first reference line in the current lane to the biased reference line in the current lane;
   generate a second reference line for an adjacent lane from the received sensor data;
   select a best trajectory from a plurality of trajectories from the biased reference line to the second reference line for the adjacent lane; and
   generate one or more commands to navigate from the biased reference line in the current lane to the second reference line in the adjacent lane.

2. The system of claim 1, wherein the first reference line is a center reference line in the current lane and the second reference line is a center reference line in the adjacent lane.

3. The system of claim 1, wherein the biased offset is an offset between the center of the current lane and a border of the current lane, the border separating the current lane and the adjacent lane.

4. The system of claim 1, the data processing system waiting for a minimum period of time between the generated one or more commands to navigate the vehicle from the first reference line in the current lane to the biased reference line in current lane and generate one or more commands to navigate from the biased reference line in the current lane to the second reference line in the adjacent lane, the period of time allowing a driver in a vehicle in the adjacent lane to see the vehicle navigate towards the border of the current lane before navigating to the adjacent lane.

5. The system of claim 1, wherein the best trajectory from the first reference line to the biased reference line is selected based on objects detected in each of the plurality of trajectories, constraint considerations, and costs of each trajectory.

6. The system of claim 5, wherein the constraints include a lateral boundary and lateral speed.

7. The system of claim 5, wherein the costs for each trajectory include a change time duration cost and a lateral jerk cost.

8. The system of claim 1, the data processing system generating a plurality of trajectories from the first reference line to the biased reference line in the current lane, the best trajectory selected from the plurality of trajectories.

9. The system of claim 1, further comprising:
navigating the vehicle from the first reference line in the current lane to a first biased reference line in the current lane, the first biased reference line associated with the maximum bias offset;
navigating the vehicle from the first biased reference line in the current lane to a second biased reference line in the current lane, the second biased reference line associated with the minimum bias offset,
the one or more commands generated to navigate the vehicle from the biased reference line in the current lane to the second reference line in the adjacent lane generated to navigate the vehicle from the second biased reference line associated with the minimum bias offset.

10. A non-transitory computer readable storage medium having embodied thereon a program, the program being executable by a processor to perform a method for automatically navigating a vehicle between lanes using a bias offset, the method comprising:
generating a first reference line in a current lane from received sensor data;
generating a biased reference line in the current lane with a bias offset from the received sensor data, wherein generating a biased reference line include generating a maximum bias offset and a minimum bias offset greater than zero, wherein the biased reference line is generated between the maximum bias offset and the minimum bias offset based on location of other vehicles;
selecting a best trajectory from a plurality of trajectories from the first reference line to the biased reference line;
generating one or more commands to navigate the vehicle from the first reference line in the current lane to the biased reference line in the current lane;
generating a second reference line for an adjacent lane from the received sensor data;
selecting a best trajectory from a plurality of trajectories from the biased reference line to the second reference line for the adjacent lane; and
generating one or more commands to navigate from the biased reference line in the current lane to the second reference line in the adjacent lane.

11. The non-transitory computer readable storage medium of claim 10, wherein the first reference line is a center reference line in the current lane and the second reference line is a center reference line in the adjacent lane.

12. The non-transitory computer readable storage medium of claim 10, wherein the biased offset is an offset between the center of the current lane and a border of the current lane, the border separating the current lane and the adjacent lane.

13. The non-transitory computer readable storage medium of claim 10, the method further comprising waiting for a minimum period of time between the generated one or more commands to navigate the vehicle from the first reference line in the current lane to the biased reference line in current lane and the generated one or more commands to navigate from the biased reference line in the current lane to the second reference line in the adjacent lane, the period of time allowing a driver in a vehicle in the adjacent lane to see the vehicle navigate towards the border of the current lane before navigating to the adjacent lane.

14. The non-transitory computer readable storage medium of claim 10, wherein the best trajectory from the first reference line to the biased reference line is selected based on objects detected in each of the plurality of trajectories, constraint considerations, and costs of each trajectory.

15. A method for automatically navigating a vehicle between lanes using a bias offset, comprising:
generating, by a data processing system stored in memory and executed by one or more processors, a first reference line in a current lane from sensor data received from a perception component;
generating, by the data processing system, a biased reference line in the current lane of the autonomous vehicle with a bias offset from the first reference line based on the received sensor data, wherein generating a biased reference line include generating a maximum bias offset and a minimum bias offset greater than zero, wherein the biased reference line is generated between the maximum bias offset and the minimum bias offset based on location of other vehicles;
selecting, by the data processing system, a best trajectory from a plurality of trajectories from the first reference line to the biased reference line;
generating, by the data processing system, one or more commands to navigate the vehicle from the first reference line in the current lane to the biased reference line in current lane;
generating, by the data processing system, a second reference line for an adjacent lane from the received sensor data;
selecting, by the data processing system, a best trajectory from a plurality of trajectories from the biased reference line to the second reference line for the adjacent lane;
generating, by the data processing system, one or more commands to navigate from the biased reference line in the current lane to the second reference line in the adjacent lane.

16. The method of claim 15, wherein the first reference line is a center reference line in the current lane and the second reference line is a center reference line in the adjacent lane.

17. The method of claim 15, wherein the biased offset is an offset between the center of the current lane and a border of the current lane, the border separating the current lane and the adjacent lane.

* * * * *